C. McKAY.
CAR STEP.
APPLICATION FILED MAY 4, 1915.
1,145,779.
Patented July 6, 1915.
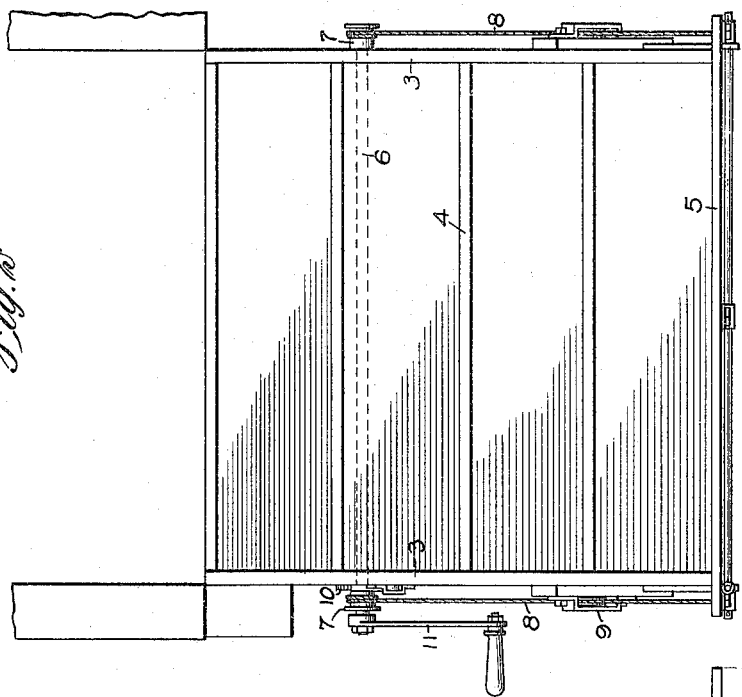
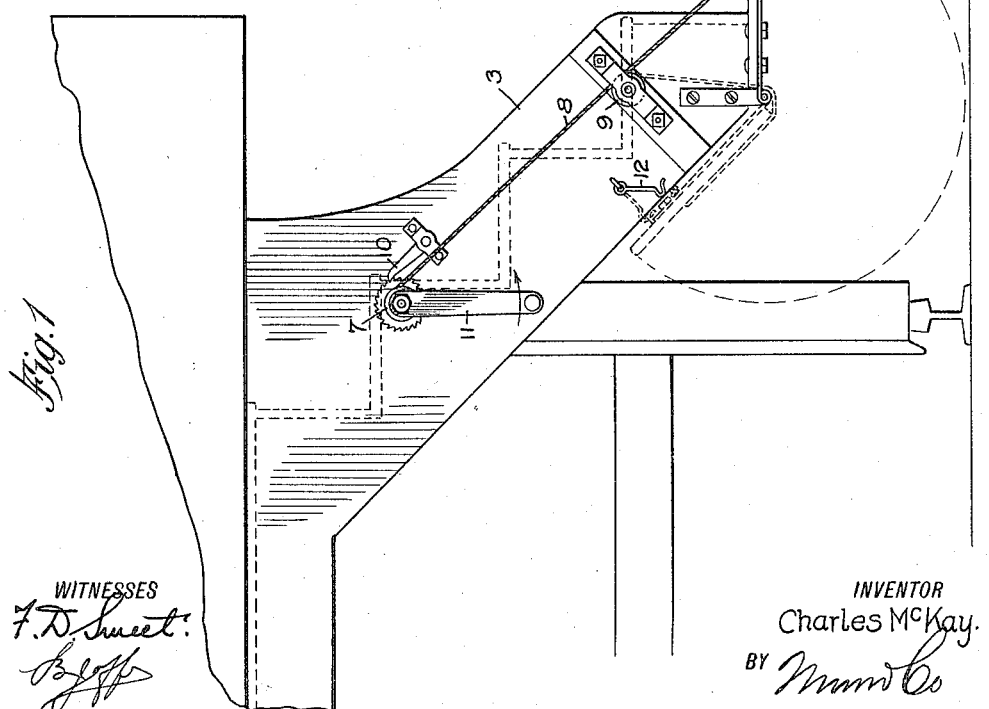
WITNESSES
INVENTOR
Charles McKay.
BY
ATTORNEYS

UNITED STATES PATENT OFFICE.

CHARLES McKAY, OF MAPLE LAKE, MINNESOTA.

CAR-STEP.

1,145,779.

Specification of Letters Patent.

Patented July 6, 1915.

Application filed May 4, 1915. Serial No. 25,708.

*To all whom it may concern:*

Be it known that I, CHARLES McKAY, a citizen of the United States, and a resident of Maple Lake, in the county of Wright and State of Minnesota, have invented a new and Improved Car-Step, of which the following is a full, clear, and exact description.

My invention relates to a car step arrangement whereby the box step in use at present with passenger cars of railways can be dispensed with.

The object of the invention is to provide a simple, convenient, inexpensive and efficient device whereby a safer ascent to and descent from a car can be obtained and thereby accidents diminished.

With the above and other objects in view, the nature of which will more fully appear as the description proceeds, the invention consists in the novel construction, combination and arrangement of parts as herein fully described, illustrated and claimed.

In the accompanying drawings, forming part of the application, similar characters of reference indicate corresponding parts in both views.

Figure 1 is a side elevation of a car provided with an embodiment of my invention; and Fig. 2 is a front elevation thereof.

Referring to the drawings, 3 represents the sides of car steps 4. Hinged to the sides 3, at the lower edge, is a step or tread 5. Passing through the sides 3 of the step is a shaft 6 which carries at each end thereof a drum 7, to each of which drums one end of a flexible member 8 is attached, the other end being connected to the tread 5. Each of the flexible members 8 pass through a guide pulley 9 secured to the corresponding side 3 of the car step. A pawl and ratchet arrangement 10 is provided at one end of the shaft 6; and at the same end, preferably, the crank 11 is located.

The tread 5, in normal position, is locked to the back of the step by means of locking members 12. When the step is to be used, the locking members 12 are disengaged from the tread, which will swing from the dotted position shown in Fig. 1 to a substantially vertical position. By turning the crank 11 in the direction indicated by the arrow in Fig. 1, the tread 5 will be brought against the lower edge of the sides 3 of the car step, and thereby parallel to the treads of the step. A passenger can then use the step to safely descend from or ascend into the car.

To place the tread 5 into inoperative position, the pawl is disengaged from the ratchet; and by turning the crank in a direction opposite to that shown by the arrow in Fig. 1, the tread can be released and brought to the position shown in dotted line in Fig. 1 and locked at the rear of the step.

Having thus described my invention, I claim as new and desire to secure by Letters Patent:

In combination with a car step, a tread hinged to the bottom of the step, locking means for maintaining the tread against the back of the step, a shaft mounted to rotate in the step, a flexible member from the shaft to the tread, a crank for rotating the shaft whereby the tread can be brought against the lower end of the step, and a pawl and ratchet arrangement interposed between the shaft and step, substantially as and for the purpose set forth.

In testimony whereof I have signed my name to this specification in the presence of two subscribing witnesses.

CHARLES McKAY.

Witnesses:
 THOS. MADIGAN,
 J. E. MADIGAN.

Copies of this patent may be obtained for five cents each, by addressing the "Commissioner of Patents, Washington, D. C."